(12) United States Patent
Chu et al.

(10) Patent No.: US 10,083,716 B1
(45) Date of Patent: Sep. 25, 2018

(54) LASER CALIBRATION FOR HEAT-ASSISTED MAGNETIC RECORDING HEAD USING INTERLEAVED LASER CURRENT

(71) Applicant: Seagate Technology LLC, Cupertino, CA (US)

(72) Inventors: Alfredo Sam Chu, Prior Lake, MN (US); Drew Michael Mader, Minneapolis, MN (US); Joshua Ward Christensen, Savage, MN (US); Jason W. Riddering, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/678,440

(22) Filed: Aug. 16, 2017

Related U.S. Application Data (60) Provisional application No. 62/393,806, filed on Sep. 13, 2016.

(51) Int. Cl.

| | |
|---|---|
| G11B 11/00 | (2006.01) |
| G11B 7/1267 | (2012.01) |
| G11B 20/12 | (2006.01) |
| G11B 5/455 | (2006.01) |
| G11B 5/00 | (2006.01) |
| G11B 7/126 | (2012.01) |
| G11B 7/1263 | (2012.01) |
| G11B 5/60 | (2006.01) |

(52) U.S. Cl.
CPC ......... *G11B 7/1267* (2013.01); *G11B 5/455* (2013.01); *G11B 20/1217* (2013.01); *G11B 5/6088* (2013.01); *G11B 7/126* (2013.01); *G11B 7/1263* (2013.01); *G11B 2005/0021* (2013.01); *G11B 2020/1232* (2013.01)

(58) Field of Classification Search
None
See application file for complete search history.

(56) References Cited

U.S. PATENT DOCUMENTS

| | | | |
|---|---|---|---|
| 8,854,929 B1 | 10/2014 | Champion et al. | |
| 9,153,272 B1 | 10/2015 | Rausch et al. | |
| 9,202,506 B1 * | 12/2015 | Mader | G11B 7/1263 369/13.26 |
| 9,236,081 B1 * | 1/2016 | Chu | G11B 11/10595 369/13.26 |
| 9,536,550 B1 * | 1/2017 | Ma | G11B 5/455 369/13.26 |

(Continued)

*Primary Examiner* — Tan X Dinh
(74) *Attorney, Agent, or Firm* — Hollingsworth Davis, LLC (57) ABSTRACT

A heat-assisted magnetic recording head is moved relative to a magnetic recording medium. The medium comprises a plurality of sectors. The sectors define a plurality of sector groups distributed around a circumference of the medium. The sectors of each sector group are written using different operational currents supplied to a laser diode of the head such that at least one sector from each sector group is written using one of the different operational currents. For each of the different operational currents, an average write performance metric is calculated for all sectors written at each of the different operational currents. A particular operational current of the different operational currents is determined that results in a best average write performance metric.

20 Claims, 9 Drawing Sheets

(56) References Cited

U.S. PATENT DOCUMENTS

| | | | | |
|---|---|---|---|---|
| 9,741,378 B1* | 8/2017 | Yang | .................... | G11B 5/488 |
| | | | | 369/13.26 |
| 9,741,385 B1* | 8/2017 | Rausch | ................ | G11B 7/1263 |
| | | | | 369/13.26 |
| 9,805,741 B1* | 10/2017 | Ma | .......................... | G11B 5/09 |
| | | | | 369/13.26 |
| 9,842,619 B1* | 12/2017 | Chu | .................... | G11B 7/1267 |
| | | | | 369/13.26 |
| 9,865,296 B1* | 1/2018 | Chin | .................... | G11B 7/1267 |
| | | | | 369/13.26 |
| 2015/0255101 A1* | 9/2015 | Mathew | ............. | G11B 5/59627 |
| | | | | 711/114 |
| 2015/0332725 A1 | 11/2015 | Rausch et al. | | |
| 2016/0055881 A1 | 2/2016 | Cordle et al. | | |
| 2016/0240216 A1* | 8/2016 | Ma | ...................... | G11B 7/1263 |
| | | | | 369/13.26 |

* cited by examiner

Figure 16

LASER CALIBRATION FOR HEAT-ASSISTED MAGNETIC RECORDING HEAD USING INTERLEAVED LASER CURRENT

RELATED PATENT DOCUMENTS

This application claims the benefit of Provisional Patent Application Ser. No. 62/393,806, filed on Sep. 13, 2016, to which priority is claimed pursuant to 35 U.S.C. § 119(e), and which is incorporated herein by reference in its entirety.

SUMMARY

Various embodiments are directed to a method comprising moving a heat-assisted magnetic recording head relative to a magnetic recording medium, the medium comprising a plurality of sectors, and the sectors defining a plurality of sector groups distributed around a circumference of the medium. The method comprises writing to sectors of each sector group using different operational currents supplied to a laser diode of the head such that at least one sector from each sector group is written using one of the different operational currents. The method also comprises calculating, for each of the different operational currents, an average write performance metric for all sectors written at each of the different operational currents, and determining a particular operational current of the different operational currents that results in a best average write performance metric.

Other embodiments are directed to an apparatus comprising a heat-assisted magnetic recording head configured to move relative to a magnetic recording medium. The medium comprises a plurality of sectors, and the sectors define a plurality of sector groups distributed around a circumference of the medium. A laser diode is provided at the head and configured to receive an operational current from a current source. A controller is configured to coordinate writing to sectors of each sector group using different operational currents supplied to the laser diode such that at least one sector from each sector group is written using one of the different operational currents. The controller is also configured to calculate, for each of the different operational currents, an average write performance metric for all sectors written at each of the different operational currents, and determine a particular operational current of the different operational currents that results in a best average write performance metric.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to heat-assisted magnetic recording, which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature having dimensions less than 100 nm (e.g., ~50 nm).

Figure 1:
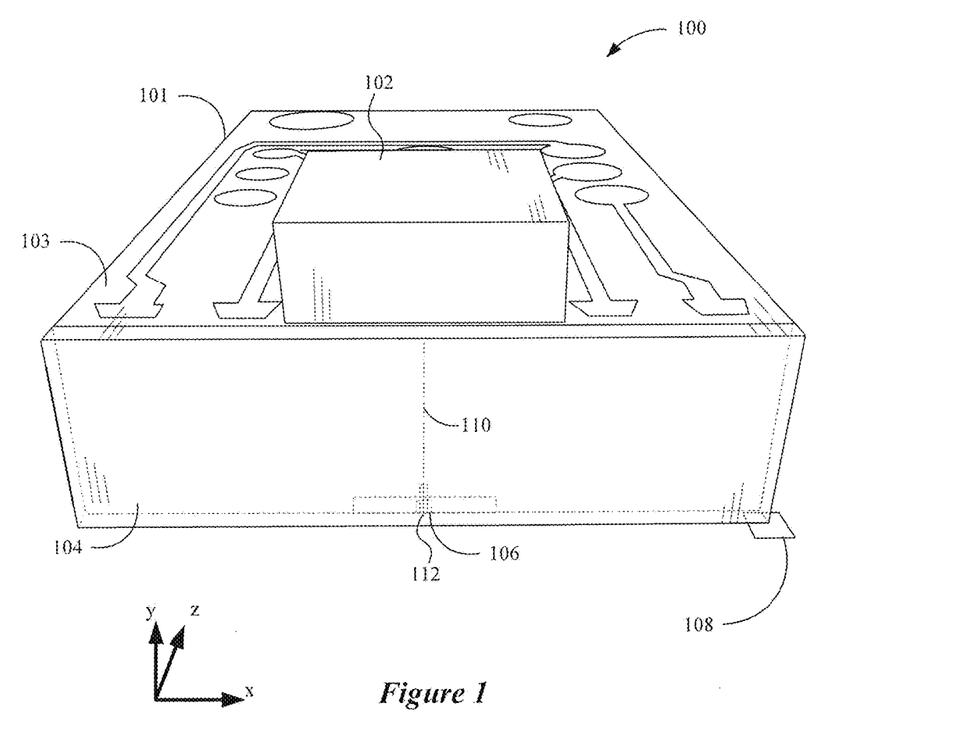
FIG. 1 is a perspective view of a hard drive slider configured for heat-assisted magnetic recording (HAMR) in accordance with embodiments described herein.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components are formed integrally within the slider body 101 (near a trailing edge surface 104 in this example) and function as an optical path that delivers energy from the laser diode 102 to the recording media via a near-field transducer 112. The near-field transducer 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
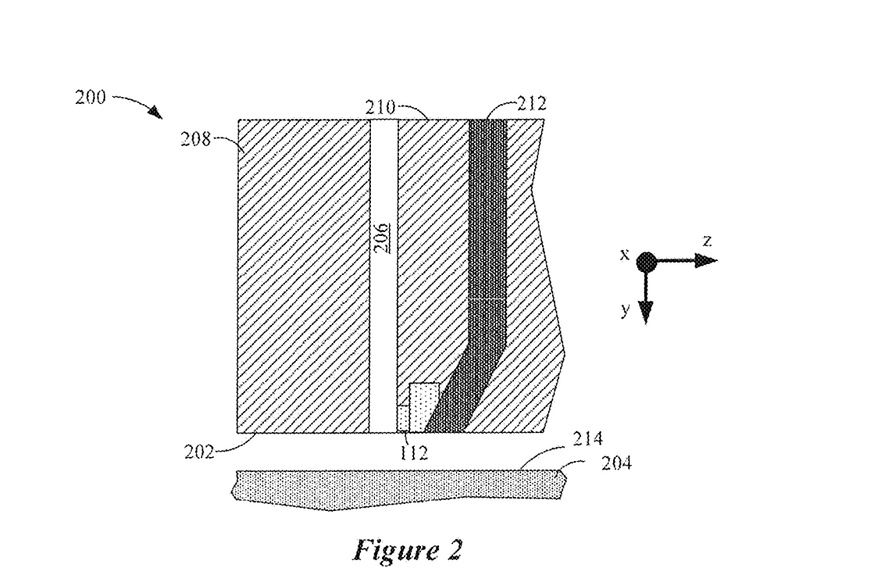
FIG. 2 is a cross-sectional view showing details of a HAMR slider according to various implementations.

With reference now to FIG. 2, a cross-sectional view shows details of a HAMR apparatus 200 according to an example embodiment. Near-field transducer 112 is located proximate a media-facing surface 202 (e.g., ABS), which is held near a magnetic recording media 204 during device operation. In the orientation of FIG. 2, the media-facing surface 202 is arranged parallel to the x-z plane. A waveguide core 206 may be disposed proximate the NFT 112, which is located at or near the media writing surface 214.

The waveguide core 206 surrounded by cladding layers 208, 210. The waveguide core 206 and cladding layers 208, 210 may be made from dielectric materials. Generally, the dielectric materials are selected so that the refractive index of the waveguide core layer 206 is higher than refractive indices of the cladding layers 208, 210. This arrangement of materials facilitates efficient propagation of light through the waveguide. Light is delivered from the waveguide core 206 along the negative y-direction where it is coupled to the NFT 112. The NFT 112 delivers surface plasmon enhanced, near-field electromagnetic energy along the y-axis where it exits at the media writing surface 214. This may result in a highly localized hot spot (not shown) on the media surface 214 when the media 204 placed in close proximity to surface 202 of the apparatus 200. Further illustrated in FIG. 2 is a write pole 212 of the read/write head that is located alongside the NFT 112. The write pole 212 generates a magnetic field (e.g., perpendicular field) used in changing the magnetic orientation of the hotspot during writing.

Figure 3:
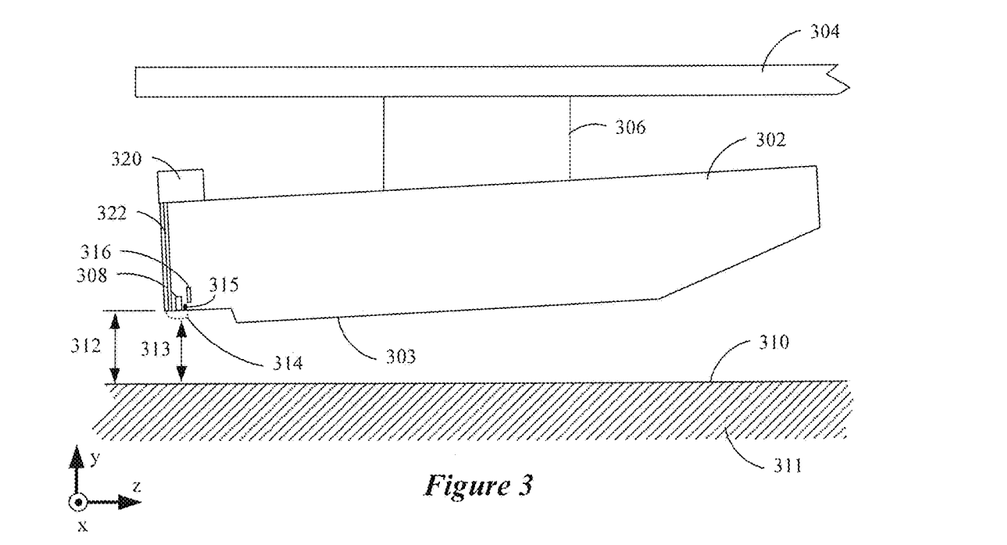
FIG. 3 illustrates a HAMR slider in accordance with some aspects described herein.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read/write head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314.

In this example, the geometry change may be induced, in whole or in part, by an increase or decrease in temperature of the region 314 via one or more heaters 316. A thermal sensor 315 is shown situated at or near the close point 314 (e.g., adjacent the read/write transducers 308, such as near the near-field transducer) or can be positioned at other location of the ABS 303.

Embodiments of the disclosure are directed to calibrating a laser of a HAMR head using interleaved laser current. According to various embodiments, current supplied to the laser diode of a HAMR head is interleaved throughout a revolution of a magnetic recording medium so as to average out variations in one or more write performance metrics around a written track. Interleaving the laser current significantly reduces the time required to calibrate the laser of a HAMR head in comparison to conventional laser calibration techniques.

Laser calibration using interleaved laser current is particularly useful in the field when laser calibration of a HAMR head is needed during normal service use of a HAMR drive (noting that it can also be used in the factory during HAMR drive assembly). Because of time and customer constraints in the field, conventional laser calibration techniques cannot be used. For example, a conventional laser calibration technique used in the factory can involve writing individual tracks using one of a number of individual laser operational currents ($I_{OP}$), analyzing the track-average bit error rate (BER) for each individual $I_{OP}$, then selecting the optimum $I_{OP}$, which is very time consuming. Instead of using a single $I_{OP}$ over a revolution, a laser calibration approach of the present disclosure involves increasing and decreasing the $I_{OP}$ throughout one revolution. The interleaved current aspect to laser calibration according to embodiments of the disclosure serves to alleviate the intrinsic BER (or other write performance metric) variation around the revolution of the medium, which is thought to arise from media variation.

To understand the reason for interleaving the laser current during the laser calibration, consider the following. If the $I_{OP}$ is increased in a simple linear fashion around the revolution (e.g., sectors 0-9 use $I_{OP}$ 100, sectors 10-19 use $I_{OP}$ 101, sectors 20-29 use $I_{OP}$ 102, etc.), the intrinsic variation in the BER will confound the laser calibration and therefore possibly result in selection of a non-ideal $I_{OP}$. Using this approach, the intrinsic BER variation would have to be calculated beforehand, presumably at varying locations around the medium, and would have to be subsequently calibrated out every time a laser calibration is performed. This would be extremely time consuming given the time constraints for calibrating the laser in the field.

Figure 4:
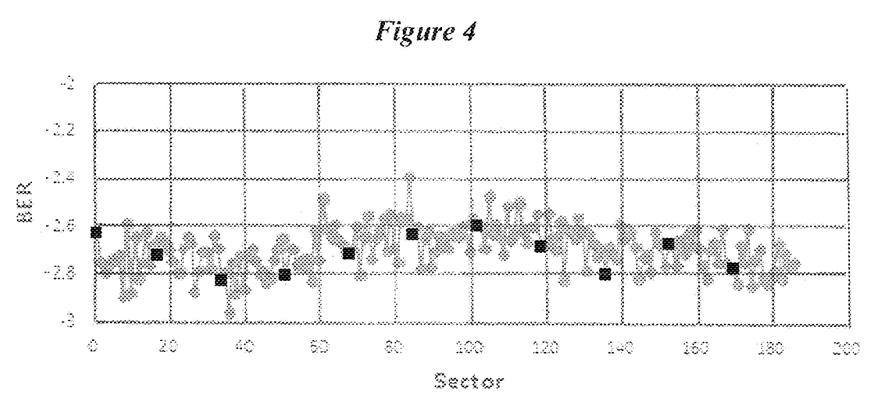
FIG. 4 illustrates the bit error rate (BER) variation around one revolution of the medium when sectors are written with one laser diode operational current.

FIG. 4 illustrates the BER variation around one revolution of the medium when sectors are written using one $I_{OP}$ (no interleaving of laser current). In FIG. 4, the BER for each nth (where n=17 in FIG. 4) sector written using the same $I_{OP}$ is indicated by a square. A curve drawn through each of the squares shown in FIG. 4 would reveal the low-frequency nature of the intrinsic BER variation around the medium. In FIG. 4, the difference (delta) between the best BER value (~-2.98) and the worst BER value (~-2.39) is roughly 0.6 decade.

In accordance with various embodiments, laser calibration using interleaved laser current involves increasing/decreasing the $I_{OP}$ in Y smaller segments (e.g., one sector at a time) and then reverting back to the initial value of $I_{OP}$ after X number of $I_{OP}$ levels are used, which results in averaging out the BER variation around the medium due to its low-frequency nature. During laser calibration using interleaved laser current, each $I_{OP}$ will write Y sector(s) in multiples of X*Y sector(s). Averaging out the BER variation can be achieved by analyzing the BER around the track in different groupings.

Figure 5:
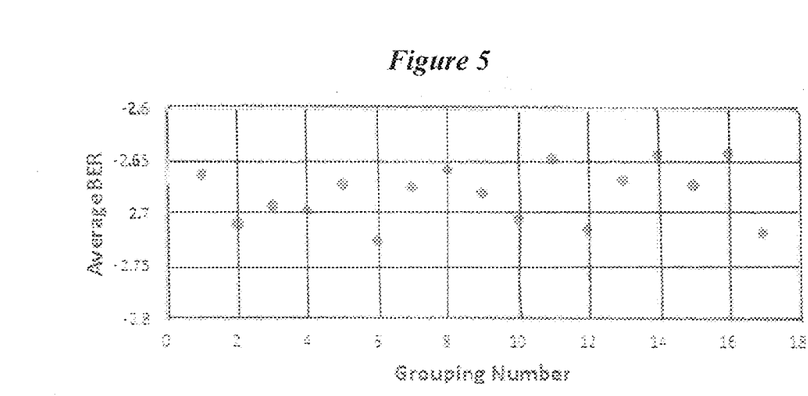
FIG. 5 shows actual data where a track was written with one laser diode operational current in accordance with various embodiments.

FIG. 5 shows actual data where a track was written with one $I_{OP}$ value broken down into 17 groups (Y and X being 1 and 17 respectively), and the average BER of each group calculated. The data of FIG. 5 demonstrates that an interleaving approach results in a tighter distribution (smaller variation) of BER around the revolution of the medium. In FIG. 5, the difference (delta) between the best BER value (~-2.73) and the worst BER value (~-2.64) is roughly 0.1 decade. The BER variation of ~0.1 decade in FIG. 5 (with interleaving) is a significant improvement over the BER variation of ~0.6 decade in FIG. 4 (no interleaving). The variation in the average BER shown in FIG. 5 is well within the uncertainty of the measurement and within the accuracy needed by the laser calibration.

Figure 6:
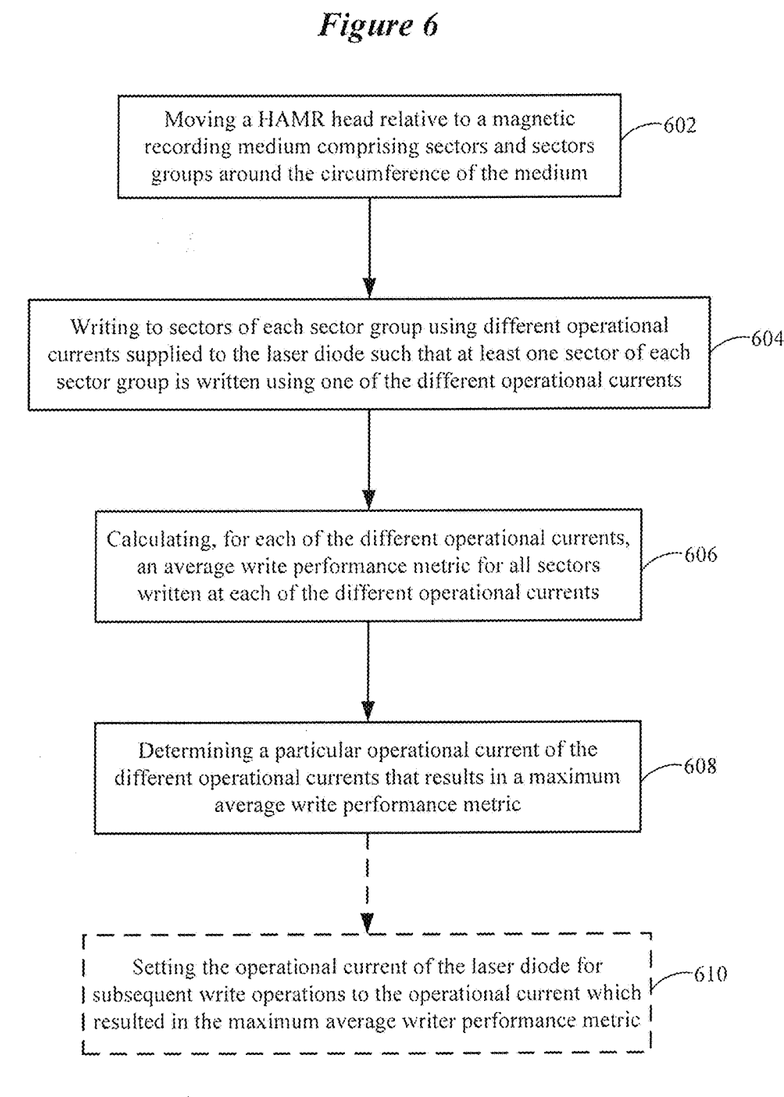
FIG. 6 is a flow chart illustrating laser calibration of a HAMR head using interleaved laser current in accordance with various embodiments.

FIG. 6 illustrates a laser calibration method using interleaved laser current in accordance with various embodiments. The method shown in FIG. 6 involves moving 602 a head relative to a magnetic recording medium. The medium comprises a plurality of sectors, wherein the sectors comprise a plurality of sector groups distributed around the circumference of the medium. The method involves writing 604 to sectors of each sector group using different operational currents supplied to the laser diode such that at least one sector of each sector group is written using one of the different operational currents. The method also involves calculating 606, for each of the different operational currents, an average write performance metric for all sectors written at each of the different operational currents. The method further involves determining 608 a particular operational current of the different operational currents that results in a best (or otherwise useful) average write performance metric. The operational current determined in block 608 is preferably stored in a memory of the HAMR device. According to some embodiments, the method also involves setting 610 the operational current of the laser diode for subsequent write operations to the operational current that resulted in the best average write performance metric.

Figure 7:
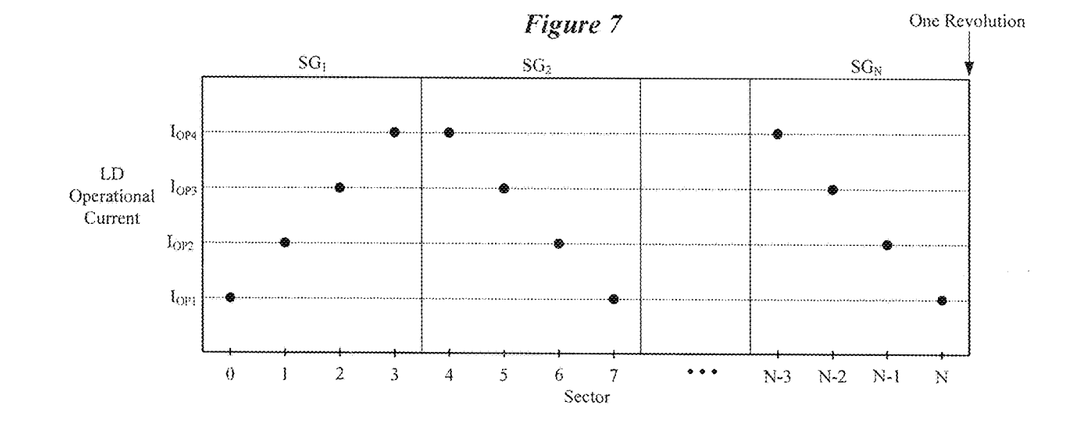
FIGS. 7 and 8 illustrate aspects of laser calibration of a HAMR head using interleaved laser current in accordance with various embodiments.
Figure 8:
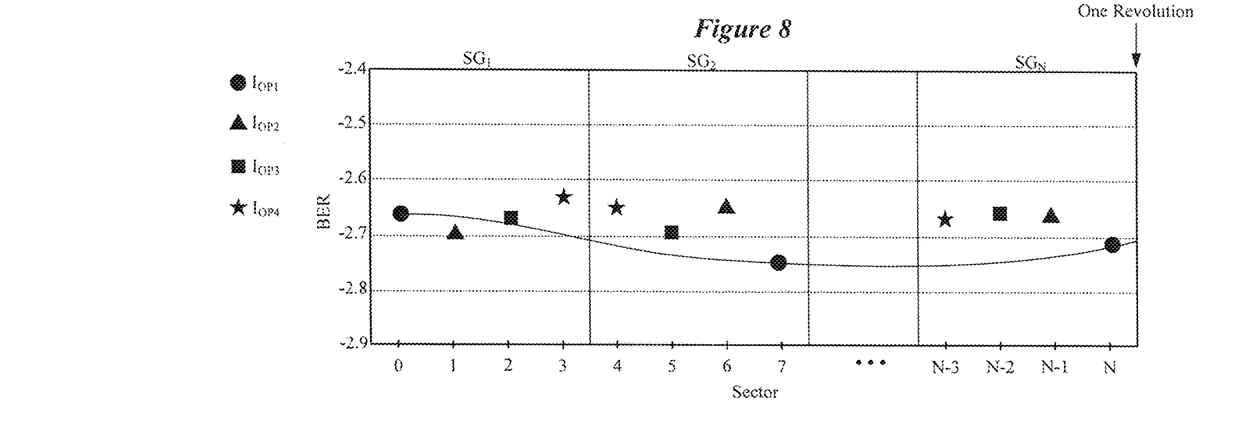

FIGS. 7 and 8 illustrate aspects of laser calibration using interleaved laser current in accordance with various embodiments. In FIG. 7, the x-axis represents the sectors by sector number (sectors 0-N) defined over one revolution of a magnetic recording medium. The sectors are arranged in sector groups ($SG_1$-$SG_N$) around one revolution of the medium. In the representative example shown in FIG. 7, each sector group is defined by four sectors. It is understood that the number of sectors comprising each sector group can be selected based on a number of factors, and can range between about 15 and 25 for example. The y-axis of FIG. 7 represents operational current of the laser diode ($I_{OP}$) when writing to the medium. In the representative example shown in FIG. 7, four different operational currents, $I_{OP1-4}$, are supplied to the laser diode when writing to the sectors of the medium over one revolution.

In general, interleaving the laser current during laser calibration of a HAMR head involves writing sectors at different circumferential locations of the medium at each of a number of different $I_{OP}$ values. As such, a multiplicity of sectors are written at different locations around one revolution of the medium at the same $I_{OP}$ value. In discussing the operational current of the laser diode, $I_{OP}$ is expressed in terms of DAC value, such 100 or 110. A DAC value represents a value of a digital-to-analog converter output. For example, a particular $I_{OP}$ DAC value can correspond to a particular amount of current (in mA) supplied to the laser diode. DAC values are generally incremented and decremented in fixed step sizes.

In the illustrative example shown in FIG. 7, each of sectors 0-3 of sector group $SG_1$ is written with a different $I_{OP}$ value. More particularly, sector 0 is written at $I_{OP1}$, sector 1 is written at $I_{OP2}$, sector 2 is written at $I_{OP3}$, and sector 3 is written at $I_{OP4}$. Generally, each subsequent sector group (e.g., $SG_2$) includes sectors that are written at the different $I_{OP}$ levels used to write the sectors of a previous sector group (e.g., $SG_1$). For example, and with reference to the sectors of sector group $SG_2$ shown in FIG. 7, sector 4 is written at $I_{OP4}$, sector 5 is written at $I_{OP3}$, sector 6 is written at $I_{OP2}$, and sector 7 is written at $I_{OP1}$. Typically, writing to sectors over one revolution of the medium at different $I_{OP}$ values follows a predetermined pattern. In FIG. 7, the operational current supplied to the laser diode is incremented and decremented in accordance with a triangle pattern. It is understood that a variety of different patterns can be used to adjust the level of $I_{OP}$ over one revolution of the medium, as will be described hereinbelow.

The laser calibration methodology also involves calculating an average write performance metric for all sectors written at each $I_{OP}$ level. This process is illustrated in FIG. 8 based on the $I_{OP}$ values used to write the sectors shown in FIG. 7. It can be seen in FIG. 7 that at least one sector of each sector group is written using the same $I_{OP}$ value. A write performance metric, such as BER, is calculated for each of the sectors written to the medium over one revolution. It is understood that a write performance metric other than BER can be calculated, such as SNR, head amplitude, track width, etc.

In FIG. 8, the BER for each sector of each sector group written using $I_{OP1}$ is indicated by a circle. The BER for each sector of each sector group written using $I_{OP2}$ is indicated by a triangle. The BER for each sector of each sector group written using $I_{OP3}$ is indicated by a square. The BER for each sector of each sector group written using $I_{OP4}$ is indicated by a star. For each of the different operational currents, $I_{OP1}$-$I_{OP4}$, an average BER is calculated for all sectors written at each of the different operational currents, as is expressed by the following equations:

$$AVG\ BER_{IOP1}=BER_{AVG}[S_0, S_7, \ldots S_N]$$

$$AVG\ BER_{IOP2}=BER_{AVG}[S_1, S_6, \ldots S_{N-1}]$$

$$AVG\ BER_{IOP3}=BER_{AVG}[S_2, S_5, \ldots S_{N-2}]$$

$$AVG\ BER_{IOP4}=BER_{AVG}[S_3, S_4, \ldots S_{N-3}]$$

In FIG. 8, a curve has been drawn through each of the BER values calculated for $I_{OP1}$ for purposes of illustrating the low-frequency variation of BER for the same operational current distributed around one revolution of the medium. This low-frequency BER variation is effectively averaged-out by analyzing the BER for each of the sector groupings distributed around one revolution of the medium.

The methodology further involves determining the operational current that results in the best (e.g., maximum, optimum or otherwise useful) average write performance metric. According to embodiments that use BER as a write performance metric, the best average write performance metric is indicated by the lowest (most negative) BER value. In the representative example shown in FIG. 8, writing to sectors using $I_{OP1}$ results in the best average write performance metric. Accordingly, the operational current $I_{OP1}$ would be supplied to the laser diode for subsequent writes to the zone of the medium in which the interleaved laser calibration was performed.

Figure 9:
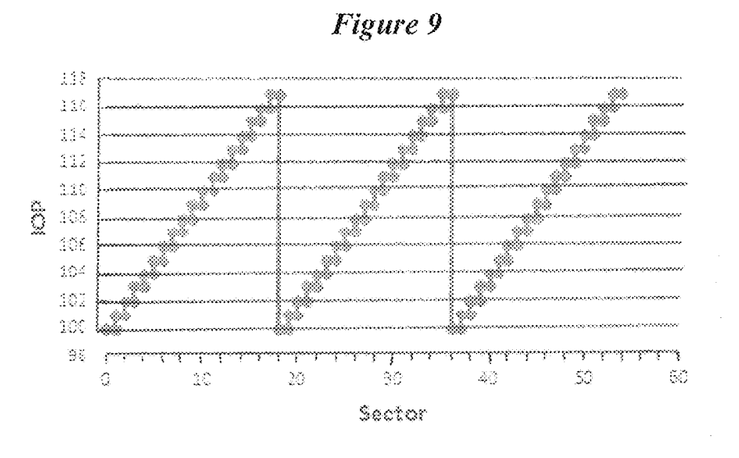
FIG. 9 illustrates an example of interleaving the laser diode operational current over a portion of a track on a magnetic recording medium in accordance with various embodiments.

FIG. 9 illustrates another example of interleaving the $I_{OP}$ over a portion of a track on the medium, where Y is set to 1 sector and X is set to 17 $I_{OP}$ levels. It is understood that the interleaving of operational current shown in FIG. 9 is performed across all of the sector groups over one revolution of the medium. For example, if the starting $I_{OP}$ is set to 100, Y is set to 1, and X is set to 17, $I_{OP}$ value 100 will write sectors 0, 17, 34, etc . . . ; $I_{OP}$ value 101 will write sectors 1, 18, 35, etc. . . . ; and so one and so forth. By analyzing the average BER of all sectors written at each $I_{OP}$ value, the BER variation is eliminated. In the illustrative example shown in FIG. 9, 17 sectors define each sector group, and the $I_{OP}$ is incremented and decremented from sector group to sector group in accordance with a sawtooth pattern.

Figure 10:
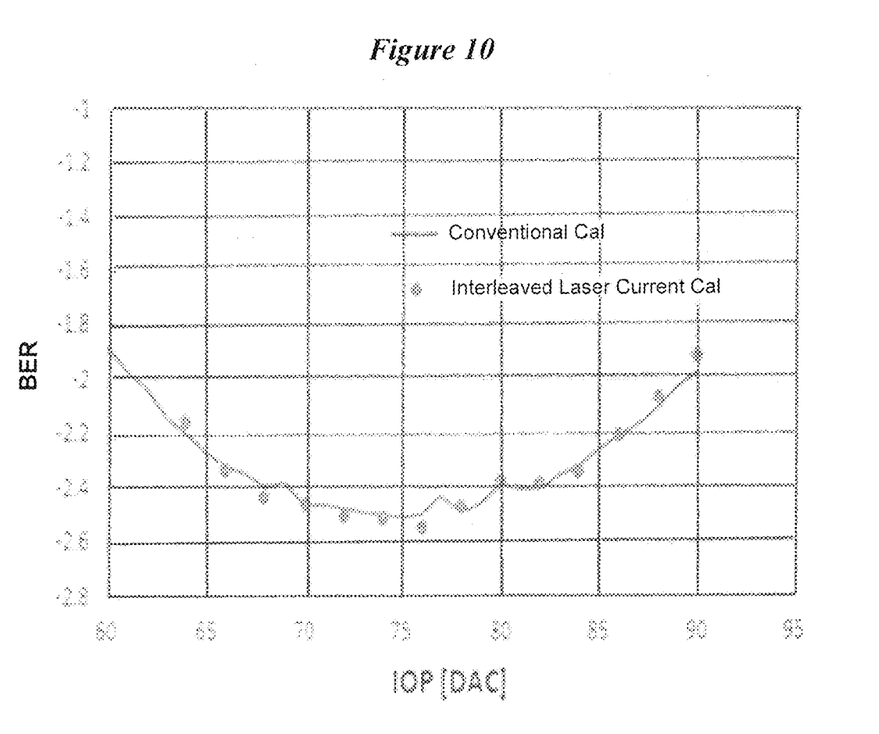
FIG. 10 shows two different methods of finding an optimum operational laser current for purposes of comparison.

FIG. 10 shows two different methods of finding the optimum laser current for purposes of comparison. In FIG. 10, the solid line represents BER data obtained when performing laser calibration of a HAMR head using a conventional time-consuming technique used in the factory (e.g., writing complete tracks at only one $I_{OP}$ as discussed above). The data indicated by circles represents BER data obtained when performing laser calibration of a HAMR head using interleaved laser current in accordance with various embodiments. It can be seen that each of the two methods depicted in FIG. 10 found approximately the same optimum laser current (e.g., $I_{OP}$=76 DAC).

Notably, calibrating the laser diode of a HAMR head using interleaved current results in identifying the same optimum laser current as a conventional time-consuming approach. The amount of time saved using an interleaved current calibration approach in comparison to a conventional approach can be expressed in terms of number of revolutions required to complete each of the two calibrations. Generally, writing to sectors at each of the different $I_{OP}$ values for both conventional and interleaved current methodologies involves writing to three consecutive tracks N (center track), N+1 (side track), and N−1 (side track), with the center track N being written first. The BER or other write performance metric is determined based on data read from the center track, N subsequent to the write operations. In an example that involves sweeping of 20 different $I_{OP}$ values (and ignoring seek operations), the conventional laser calibration methodology requires a total of 60 revolutions of write operations and 20 revolutions of read operations (a total of 80 revolutions). In stark contrast, laser calibration using interleaved current involves a total of 3 revolutions of write operations and 1 revolution of read operations (a total of 4 revolutions). It is noted that laser calibration using interleaved current can be accomplished in as few as 2 revolutions, but with a reduced write performance relative to use of 4 revolutions.

FIGS. 11-14 illustrate different patterns of interleaved operational currents that can be used in a laser calibration procedure in accordance with various embodiments. For purposes of illustration and not of limitation, in FIGS. 11-14, each of 14 different $I_{OP}$ values (X=14) are used to write 1 sector (Y=1) of each sector group, with a step size of 2 between each DAC value. It is noted that the parameter Y can be an integer greater than 1 (e.g., an integer between 2-5). It is also noted that the step size between $I_{OP}$ increments and decrements can be greater or less than 1 or 2 depending on the preamplifier design.

Figure 11:
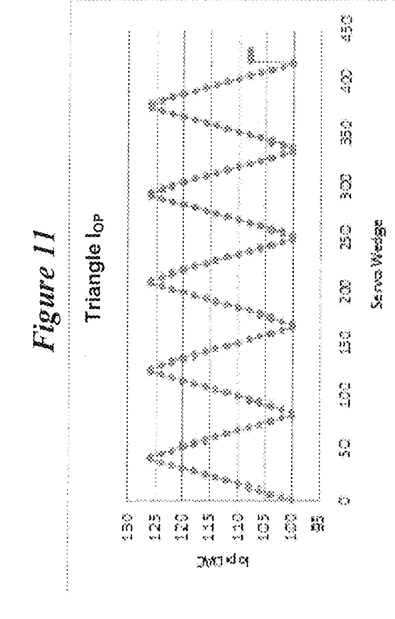
FIGS. 11-14 illustrate different patterns of interleaved operational current that can be used in a laser calibration procedure of a HAMR head in accordance with various embodiments.

In FIG. 11, the 14 sectors of a first sector group are written by successively increasing the $I_{OP}$ by 2 DAC units after writing the first sector. The next 14 sectors of a second sector group are written by successively decrementing the $I_{OP}$ by 2 DAC units after writing the first sector of the second sector group using the last $I_{OP}$ value for the first sector group. The $I_{OP}$ adjustments used to write the sectors of the first and second sector groups are repeated for writing sectors of subsequent sector groups, which results in adjusting the Iop according to a triangle pattern over one revolution.

Figure 12:
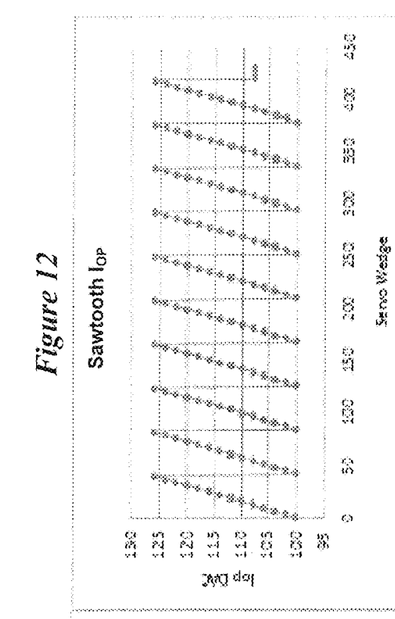

In FIG. 12, the 14 sectors of a first sector group are written by successively increasing the $I_{OP}$ by 2 DAC units after writing the first sector. The next 14 sectors of a second sector group are written by successively incrementing the $I_{OP}$ by 2 DAC units after writing the first sector of the second sector group using the first $I_{OP}$ value for the first sector group. The $I_{OP}$ adjustments used to write the sectors of the first and second sector groups are repeated for writing sectors of subsequent sector groups, which results in adjusting the Iop according to a sawtooth pattern over one revolution.

Figure 13:
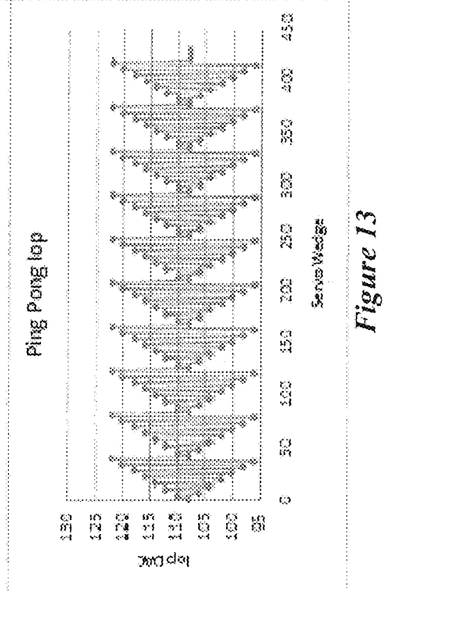

In FIG. 13, the 14 sectors of a first sector group are written by successively increasing and decreasing the $I_{OP}$ by 2 DAC units after writing the first sector in ping pong fashion. The 14 sectors of subsequent sector groups are written the same way as the first sector group, which results in adjusting the $I_{OP}$ according to a ping pong pattern over one revolution.

Figure 14:
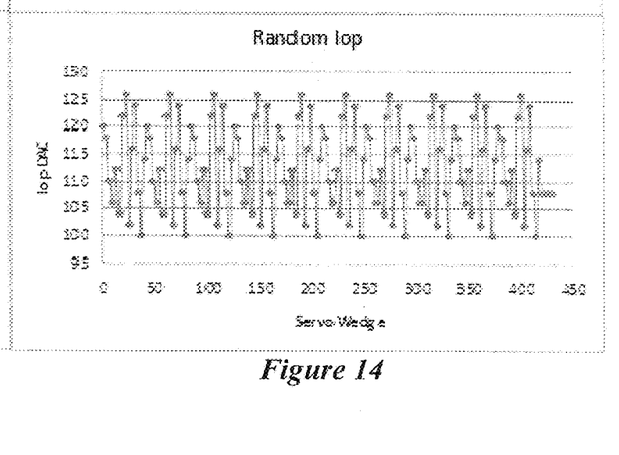

In FIG. 14, the 14 sectors of a first sector group are written by increasing and decreasing the $I_{OP}$ by 2 DAC units from sector to sector in a random fashion. The 14 sectors of subsequent sector groups are written the same way as the first sector group, which results in adjusting the $I_{OP}$ according to a random pattern over one revolution. It is understood that the operational current supplied to the laser diode of a HAMR head can be adjusted in accordance with many different patterns.

In a HAMR head, the writer region of the head (which includes the near-field transducer) is subject to laser induced writer protrusion (LIWP) when the laser diode is energized. The magnitude of LIWP is proportional to the current supplied to the laser diode. The magnitude of protrusion at the writer region is also proportional to the current supplied to the writer heater. The writer heater is adjusted during the laser calibration in order to maintain a desired fly height or clearance relative to the magnetic recording medium. The degree to which the writer heater can track the LIWP depends in large part on the pattern used to adjust the operational current, $I_{OP}$, supplied to the laser diode. It has been found that the triangle pattern shown in FIG. 11 allowed the writer heater to best track the protrusion of the writer region due to the laser current.

Figure 15:
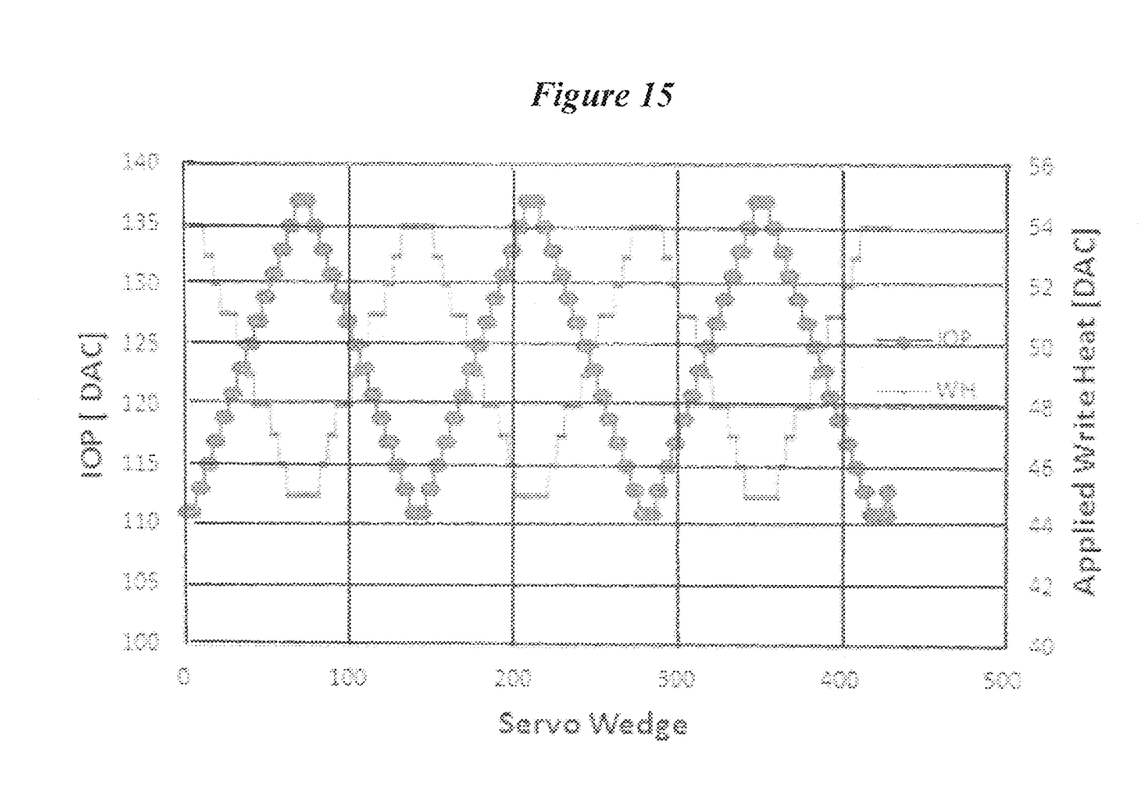
FIG. 15 shows a pattern of laser diode operational currents superimposed with writer heater currents during laser calibration of a HAMR head using interleaved current in accordance with various embodiments.

FIG. 15 shows a pattern of laser diode operational currents (in $I_{OP}$ DAC units) superimposed with writer heater currents (in writer heater DAC units) during laser calibration in accordance with various embodiments. In FIG. 15, the laser diode operational current is incremented and decremented in accordance with a triangle pattern over one revolution. The writer heater current is incremented and decremented in a manner opposite or inverse to that of the laser diode operational current. More particularly, as the laser diode operational current is increased from a minimum to a maximum, the writer heater current is reduced correspondingly from a maximum to a minimum. As the laser diode operational current is decreased from a maximum to a minimum, the writer heater current is correspondingly increased from a minimum to a maximum. As such, the adjustment pattern of the writer heater current has a triangle pattern that is opposite or inverse to the triangle pattern of the laser diode operational current. It is noted that, for other $I_{OP}$ adjustment patterns, writer heater current adjustments would be made in a similar opposite or inverse manner in order to maintain a constant clearance during calibration.

Figure 16:
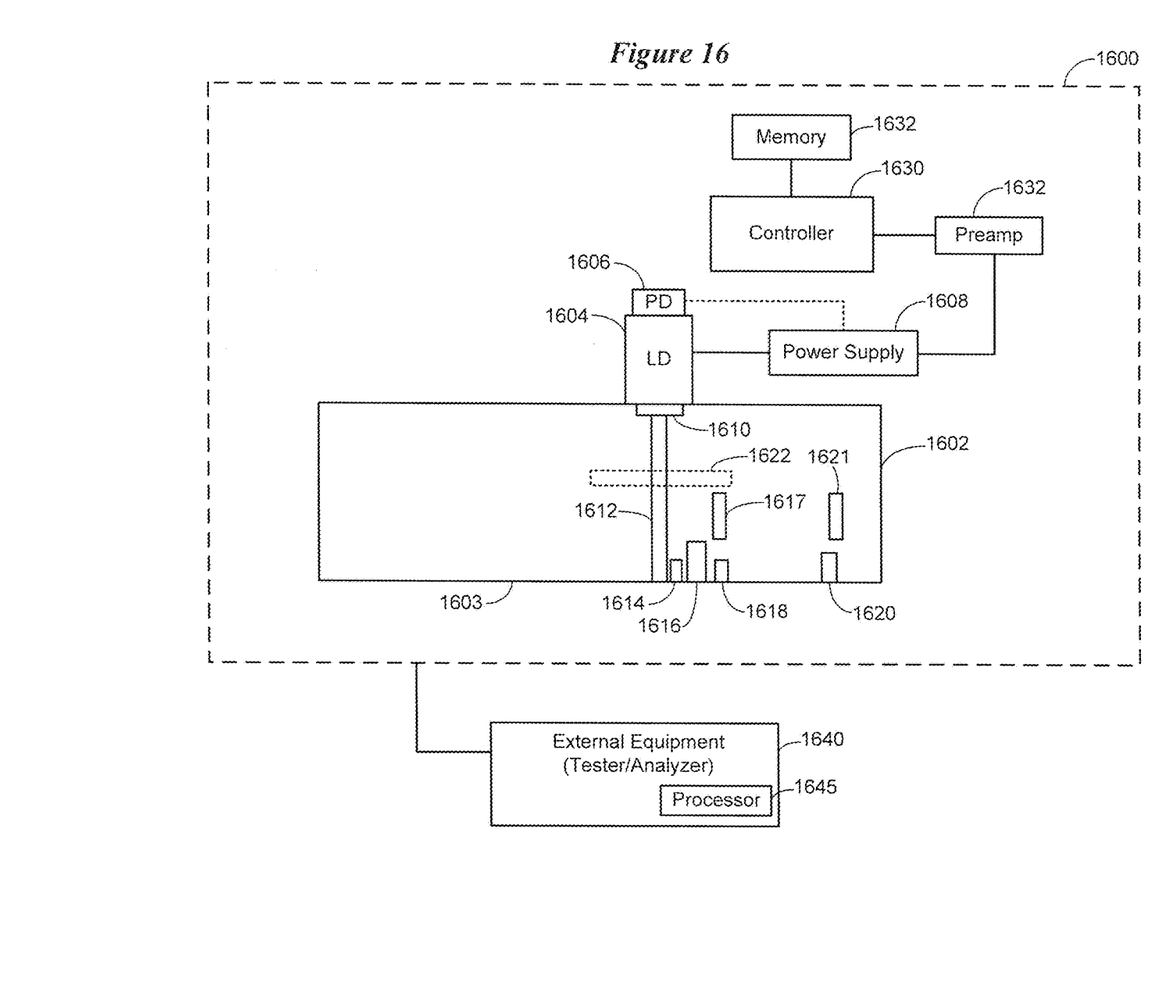
FIG. 16 is a block diagram of a system for calibrating a laser of a HAMR head using interleaved laser current in accordance with various embodiments.

FIG. 16 is a block diagram of a system for calibrating a laser of a HAMR head using interleaved laser current in accordance with various embodiments. FIG. 16 shows a portion of a HAMR drive 1600 which includes a slider 1602 upon which a laser diode 1604 is mounted. A photodetector 1606 can be mounted on or in close proximity to the laser diode 1604. A power supply 1608 is coupled to the laser diode 1604 and provides a supply current (e.g., $I_{OP}$) to the laser diode 1604. An output of the photodetector 1606 is coupled to the power supply 1608. The power supply 1608 can adjust the current supplied to the laser diode 1604 in response to the photodetector output.

The slider 1602 includes a number of components including an optical waveguide 1612 which is optically coupled to the laser diode 1604 via an optical coupler 1610. The optical waveguide 1612 extends from the optical coupler 1610 to an NFT 1614 situated at the air bearing surface 1603 proximate the optical waveguide 1612. In some embodiments, a bolometer 1622 is situated proximate the optical waveguide 1612. A writer 1616 is situated proximate the NFT 1614. A writer heater 1617 is situated proximate the writer 1616 and configured to thermally actuate the writer 1616 (e.g., writer pole/NFT). A contact sensor 1618 may situated proximate the writer 1616 and NFT 1614 (e.g., at a close point of the writer). A reader 1620 is shown positioned away from the writer 1616 and contact sensor 1618. A reader heater 1621 is positioned proximate the reader 1620 and configured to thermally actuate the reader 1620.

The HAMR drive 1600 further includes a controller 1630 (e.g., microprocessor or microcontroller) coupled to a non-volatile memory 1632. Among other functions, the controller 1630 is configured to implement laser calibration using interleaved laser diode current for the HAMR head in accordance with various embodiments. For example, the controller 1630 is configured to implement executable instructions corresponding to the flow chart and other figures discussed hereinabove. The controller 1630 can store the operational current ($I_{OP}$) that corresponds to the best write performance metric as discussed hereinabove in the memory 1632. The controller 1630 can also set the $I_{OP}$ of the laser diode for normal write operations to the optimum $I_{OP}$ stored in the memory 1632.

The power supply 1608 is also coupled to a preamplifier 1632. The preamplifier 1632 can provide the power supply 1608 with signals corresponding to $I_{OP}$ values for setting the operational current supplied to the laser diode 1604 during laser calibration according to a desired $I_{OP}$ adjustment pattern. For example, the preamplifier 1632 can be updated by the controller 1630 (which may incorporate or be coupled to a servo controller) with multiple $I_{OP}$ and writer heater data using an array from the controller 1630. The array may include multiple $I_{OP}$ DAC values and writer heater DAC values that correspond to the $I_{OP}$ DAC values for keeping the write clearance constant during laser calibration.

When writing sectors with multiple laser diode operational currents around the revolution of the medium, it is important to ensure that each sector is written using the corresponding $I_{OP}$, especially when a sector is a split sector. A split sector is a sector that has one or more servo data between the sector. In some cases, a split sector may need to be placed in a special track layout that guarantees that each sector starts immediately after a servo sector.

In some embodiments, external equipment 1640 (tester/analyzer) is coupled to the HAMR drive 1600 and used during manufacture or design development, for example.

The external equipment 1640 includes a processor 1645 (or processor) which cooperates with or overrides the controller 1630 of the HAMR drive 1600. The processor 1645 of the tester/analyzer 1640 can be configured to perform some or all of the functions attributed to the controller 1630 of the drive 1600 when implementing laser calibration of a HAMR head using interleaved laser current in accordance with various embodiments.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
    moving a heat-assisted magnetic recording head relative to a magnetic recording medium, the medium comprising a plurality of sectors, the sectors defining a plurality of sector groups distributed around a circumference of the medium;
    writing to sectors of each sector group using different operational currents supplied to a laser diode of the head such that at least one sector from each sector group is written using one of the different operational currents;
    for each of the different operational currents, calculating by a controller an average write performance metric for all sectors written at each of the different operational currents; and
    determining, by the controller, a particular operational current of the different operational currents that results in a best average write performance metric.

2. The method of claim 1, comprising storing the particular operational current in non-volatile memory accessible by the head.

3. The method of claim 1, comprising setting the operational current of the laser diode for subsequent write operations to the particular operational current that results in the best average writer performance metric.

4. The method of claim 1, wherein the method is completed within four or fewer revolutions of the medium.

5. The method of claim 1, wherein:
    writing to the sectors is completed within no more than three revolutions of the medium; and
    calculating the average write performance metric involves reading the sectors over no more than one revolution of the medium.

6. The method of claim 1, wherein:
    writing to the sectors comprises writing to sectors of three consecutive tracks with a center track of the three consecutive tracks being written first; and
    calculating the average write performance metric involves reading the sectors from the center track.

7. The method of claim 1, wherein the method is repeated for each of a plurality of zones of the medium distributed between and inner and outer diameter of the medium.

8. The method of claim 1, wherein the different operational currents are incremented and decremented over a revolution of the medium according to a triangle pattern.

9. The method of claim 1, wherein the different operational currents are incremented and decremented over a revolution of the medium according to a sawtooth pattern.

10. The method of claim 1, wherein the different operational currents are incremented and decremented over a revolution of the medium according to a ping pong or random pattern.

11. An apparatus, comprising:
    a heat-assisted magnetic recording head configured to move relative to a magnetic recording medium, the medium comprising a plurality of sectors, the sectors defining a plurality of sector groups distributed around a circumference of the medium;
    a laser diode provided at the head and configured to receive an operational current from a current source; and
    a controller configured to:
        coordinate writing to sectors of each sector group using different operational currents supplied to the laser diode such that at least one sector from each sector group is written using one of the different operational currents;
        calculate, for each of the different operational currents, an average write performance metric for all sectors written at each of the different operational currents; and
        determine a particular operational current of the different operational currents that results in a best average write performance metric.

12. The apparatus of claim 11, wherein the controller is configured to store the particular operational current in non-volatile memory accessible by the head.

13. The apparatus of claim 11, wherein the controller is configured to set the operational current of the laser diode for subsequent write operations to the particular operational current that results in the best average write performance metric.

14. The apparatus of claim 11, wherein the controller is configured to complete the writing and average write performance metric calculations within four or fewer revolutions of the medium.

15. The apparatus of claim 11, wherein the controller is configured to:
    complete the writing to the sectors within no more than three revolutions of the medium; and
    calculate the average write performance metric by reading the sectors over no more than one revolution of the medium.

16. The apparatus of claim 11, wherein the controller is configured to:
    coordinate writing to sectors of three consecutive tracks with a center track of the three consecutive tracks being written first; and
    calculate the average write performance metric by reading the sectors from the center track.

17. The apparatus of claim 11, wherein the controller is configured to repeat writing, calculating, and determining processes for each of a plurality of zones of the medium distributed between and inner and outer diameter of the medium.

18. The apparatus of claim 11, wherein the controller is configured to increment and decrement the different operational currents over a revolution of the medium according to a triangle pattern.

19. The apparatus of claim 11, wherein the controller is configured to increment and decrement the different operational currents over a revolution of the medium according to a sawtooth pattern.

20. The apparatus of claim 11, wherein the controller is configured to increment and decrement the different operational currents over a revolution of the medium according to a ping pong or random pattern.

* * * * *